United States Patent Office 2,760,847
Patented Aug. 28, 1956

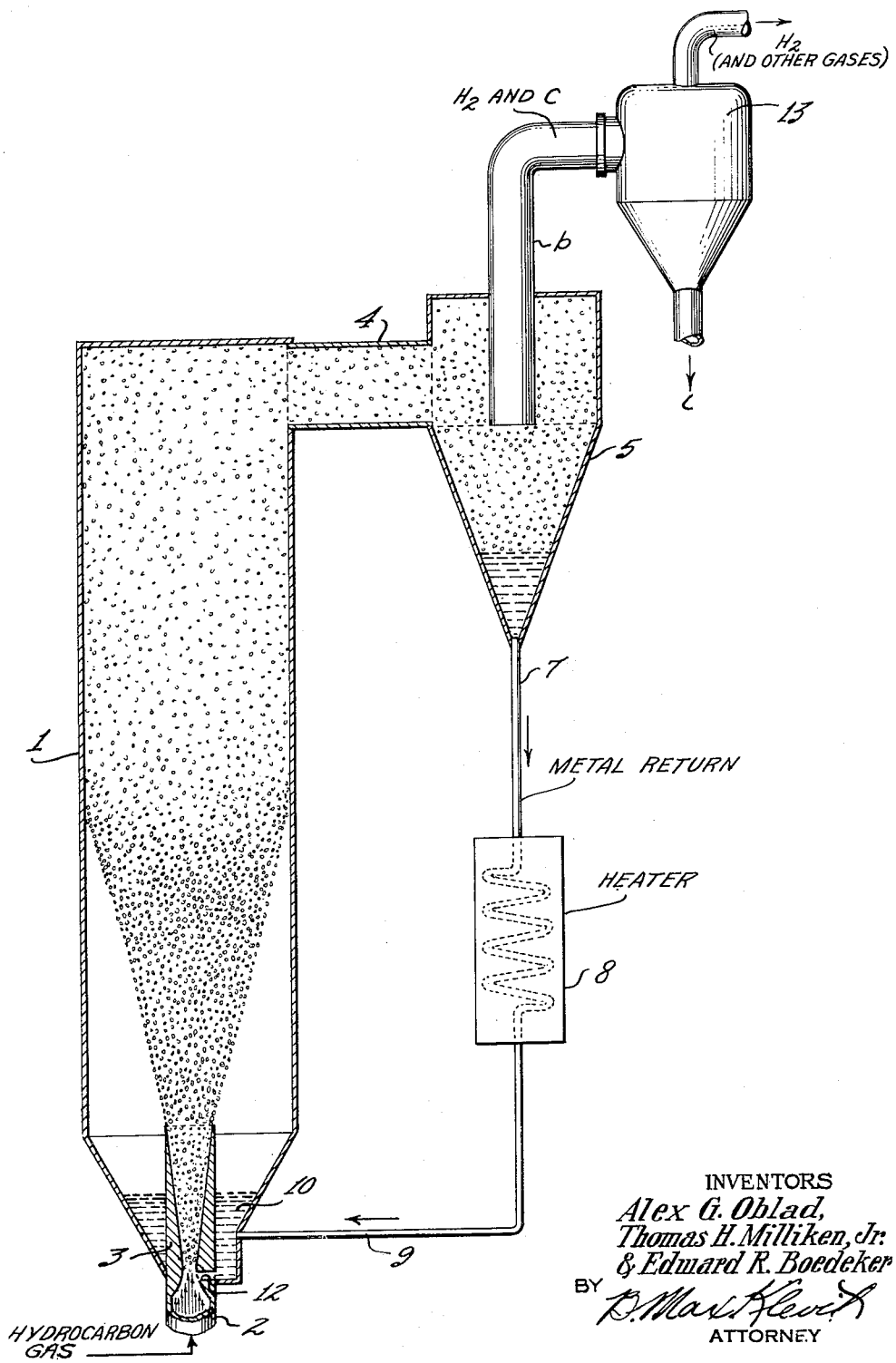

2,760,847

PRODUCTION OF HYDROGEN AND CARBON

Alex G. Oblad, Springfield, and Thomas H. Milliken, Jr., Moylan, Pa., and Edward R. Boedeker, Wilmington, Del., assignors to Houdry Process Corporation, Wilmington, Del., a corporation of Delaware Application November 13, 1951, Serial No. 256,098

3 Claims. (Cl. 23—209.5)

The present invention relates to catalytic decomposition of low molecular weight hydrocarbons for the production of hydrogen and is particularly directed to improvements in such processes whereby high yields of hydrogen are obtained without accompanying production of difficultly separable gases. In the preferred operation of the process the hydrocarbon gas having up to 4 carbon atoms or mixture of gases containing the same is decomposed at elevated temperature in the presence of selected catalysts under conditions resulting in the production, accompanying the hydrogen, of carbon black, recoverable and suitable for use in industrial processes.

It has long been known that hydrocarbon gases can be thermally decomposed to elemental carbon and hydrogen and it has been proposed to effect such decomposition by supplying heat to the process through the medium of a ceramic material preheated to high temperatures or by contacting the hydrocarbon gas with a bath of molten metal. Such thermal noncatalytic decomposition produces only relatively low yields of hydrogen and the gaseous reaction products contain fairly large quantities of higher molecular weight unsaturated hydrocarbon products including ethylene, acetylene and various polymerized reaction products which may include benzene and other aromatic compounds. At higher temperatures, as in the so-called "Thermatomic Process" operating at temperatures above about 2000° F., the carbon formed by impingement of the hydrocarbon gas against the heated refractory is not recoverable as a useful commercial product, and in the practice of such processes about ⅔ of the total quantity of the carbon black produced is left in the furnace for consumption in the alternating air blow employed in heating up the refractory.

It has been attempted to decompose hydrocarbon gases at lower temperatures in the presence of catalysts such as nickel, but in such operations the catalyst becomes rapidly fouled with carbon and the removal of this product presents difficulties that have prevented the practical application of this process.

In accordance with the present invention the decomposition of methane and/or other hydrocarbon gases up to and including butane, is effected catalytically but under conditions such that the carbon formed is relatively easily removed so as not to interfere with the continuous operation of the process and the carbon formed is recoverable for use in industrial processes. This desirable result is accomplished by contacting the hydrocarbon gas, which may be a natural gas mixture containing such hydrocarbon gas, with a molten metal or alloy containing therein dissolved and/or suspended metallic dehydrogenation catalysts.

To obtain a high area of intimate contact with the catalyst, the hydrocarbon gas and the molten metal carrier containing the catalyst, in the preferred operation, are admitted to an atomizer producing fine droplets of metal which are carried up by the gas through a reaction chamber of sufficient size to permit completion of the decomposition reaction. The suspension of liquid droplets in decomposed gas is passed through a cyclone or other gas separating means wherein the liquid is removed and returned to storage while the gaseous reaction products including suspended carbon particles are discharged overhead. In the storage tank the carbon which rises to the surface of the molten metal is removed as desired. The accompanying drawing shows schematically apparatus suitable for practice of this preferred embodiment of the invention.

Generally, decomposition of the hydrocarbon gas can be effected by merely bubbling the same through a hot bath in the molten metal containing the metallic catalyst. Since the catalytic reaction requires only a short contact time, as not more than up to about 0.1 second, the bath of molten metal may be quite shallow, as not more than about several inches in depth; however, to assure contact of the gas with active catalyst during its passage through the bath, particularly when small amounts of catalyst are employed and/or when working in the lower portion of the described operating temperature range, it is best to provide a bath of substantial depth, say about ½ foot or more. Since the ultimate products desired are elemental carbon and hydrogen, there is no apparent limitation on the maximum depth of the bed except from the standpoint of practicality and increased operating costs as a result of greater heating requirements to maintain the desired temperature and higher pressure requirements for introduction of the gas.

In this operation, the carbon being lighter than the molten metal, floats up therein to the surface of the bath and can be readily removed from the surface. At higher gas velocities the carbon, or at least a major part thereof, will be carried upwardly with the gas, in which case the same can be separated from the gas in known and conventional manner.

In the operation of the preferred embodiment illustrated in the drawings, more efficient heating and increased catalyst contact surface is available with the use of only a relatively small amount of molten metal and catalyst. There is shown in the drawing a reaction vessel 1, having at the bottom thereof a supply line for hydrocarbon gas 2, terminating in a Venturi atomizing nozzle 3 extending into the reaction chamber. The upper end of the reaction chamber communicates through line 4 with a cyclone 5 or other equivalent means suitable for separating the heavier droplets of metal from the suspension of carbon in the gas. The cyclone or other metals separator is provided with an overhead discharge line 6, and a bottom discharge line 7 running to a heater 8. Reheated metal is returned to the reaction vessel by means of a line 9 and forms a small reservoir in the bottom of the reaction vessel as indicated at 10, from which reservoir molten metal enters the throat of the Venturi through a side opening 12 therein.

The overhead line 6 from cyclone 5 goes to a gas solids separator 13, which may be any of the known conventional devices for separating suspended solids from gas such as: a simple disengager operating on the principle of gas velocity reaction, a cyclone, Cottrell precipitator, supersonic precipitator, or the like.

In the operation of this embodiment the hydrocarbon gas passed upwardly through the Venturi nozzle picks up the catalyst-containing molten metal entering through opening 12 and discharges the same as a fine spray or mist into the free area of the reaction chamber. Because of the intimacy of contact of the gas therewith and the comparatively large surface of molten metal and catalyst, the gas is rapidly raised to its decomposition temperature and is catalytically decomposed to elemental carbon and hydrogen. The hydrocarbon gas is admitted at a rate and pressure sufficient to suspend the metal droplets and to carry the same into the cyclone 5, wherein the heavy metal particles fall to the bottom to form a pool of molten metal, while the lighter fluffy carbon remains suspended in the gas and is withdrawn overhead therewith. In separator 13 the hydrogen-containing gas stream is discharged overhead, leaving the carbon which can be drawn off as desired. The hydrogen gas from methane is of high purity and even in the case of higher hydrocarbons as charge gas the product may be of sufficient purity for many required uses, as for use in operations such as hydrogenation-dehydrogenation of hydrocarbons. When charging higher molecular weight hydrocarbon gases under conditions giving comparatively lower hydrogen yields per pass, the hydrogen or a hydrogen-rich stream may be separated from the gaseous reaction products and the unconverted and partially converted hydrocarbons recycled for further production of hydrogen. If required, the hydrogen-rich gas may be further purified in conventional manner.

Whether the bath or atomizer technique is employed, the operation is carried out in a temperature range between the melting point of the carrier metal and short of its vaporization point. The lower melting point metals or alloys are preferred, comprising those melting below about 1000° C., which includes for example such metals as tin, lead, zinc, magnesium, aluminum and various low melting alloys of these metals, for example: high aluminum alloys with copper, magnesium and/or manganese; lead alloys containing tin, copper and/or antimony; and magnesium alloys containing aluminum with or without manganese.

The decomposition of the hydrocarbon gas is carried out in the absence of air so that the production of side products such as carbon oxides and water is avoided. While the reaction involved in the decomposition of methane into carbon and hydrogen is endothermic, it requires considerably less heat input than that needed in the steam-methane reaction. At a temperature of about 1300° F. for the decomposition of methane, a concentration of hydrogen in the equilibrium mixture in the order of 90 mol percent is theoretically possible from thermodynamic considerations, and in the described catalytic process hydrogen yields approaching this value can be obtained. Increase in temperature raises the thermodynamic equilibrium mol fraction of hydrogen in the reaction mixture. Other hydrocarbon gas, whether paraffinic such as ethane and propane or unsaturated gases such as ethylene and propylene, are less stable thermodynamically than methane and require lower decomposition temperatures. Inasmuch as methane is one of the decomposition products of these higher molecular weight gases, maximum possible hydrogen yields should be considered in terms of the methane equilibrium.

While catalytic decomposition of the hydrocarbon gas takes place at temperatures of 1000–1100° F., to obtain significant yields without prolonged contact, temperatures of not less than about 1200° F. should be employed and preferably at least 1400° F. Temperatures approaching the melting points of catalytic metals employed and even temperatures in the order of about 2000° F. tend to favor the production of products characteristic of thermal (not-catalytic) decomposition and are best avoided.

Among the metals that can be used as catalysts in the process there are included those of Group VI$b$ and VIII of the Periodic table, particularly iron, cobalt, nickel and the noble metals as well as chromium and molybdenum, and various alloys of these metals such as those of iron with chromium, manganese and/or nickel. All of these metals and alloys are soluble to greater or less degree in the molten metals hereinabove named as heat carriers. Because of the comparatively high catalytic surface presented, it is necessary to employ only small amounts of catalytic metal which may be as low as about 1% by weight of the molten metal but preferably somewhat higher, the minimum concentration depending upon the particular catalytic metal utilized. There is no upper limit as to the amount of catalyst included, but in most instances no significant increased advantage is obtained in using more catalyst than about 5–10% by weight of the molten metal, which in some instances is in excess of the amount of certain of the catalytic metals that can be dissolved in some of the molten metals named. It is not necessary, however, that all of the catalytic metal be present in dissolved state.

As charge to the process, there may be employed in addition to methane and other light hydrocarbon gases up to about 4 carbon atoms, unsaturated hydrocarbon gases, and available gas mixtures such as natural gas or refinery waste gases.

The wide range of molten metals that can be employed affords desired flexibility to the process from the standpoint of operating temperatures and affords the possibility of operating under selected conditions, if desired, to produce products other than elemental hydrogen and carbon, as for example, the production of unsaturated hydrocarbons at lower temperature.

The reaction vessel must be constructed of materials capable of withstanding the operating temperatures and which are not attacked by the molten metal, for example, ceramics of lowest available porosity.

Example I

Methane at room temperature was bubbled through a bath of molten aluminum, 5 inches in depth, containing 6% by weight nickel, at various temperatures up to 1800° F. and at feed rates of from 37–400 ml./min. (measured at room temperature). It was found that at constant gas feed rate higher hydrogen yields were obtained with increased temperature. Decreasing the feed rate while maintaining the temperature constant, served to increase the hydrogen production. The converted gas was composed of hydrogen of high purity, approaching 100%. At 1800° F., the hydrogen content of the product gas obtained at gas feed rates of about 100 ml./min., was comparable to that obtained at 1500–1600° F. employing lower gas feed rates. The comparatively low rates of conversion obtained at high gas feed rates are believed to be due, in part or at least, to the low heat transfer efficiency of the large bubbles formed, which can be overcome by preheating the feed gas or by the use of the described atomizing technique.

Example II

The operation described in Example I was repeated employing about 3.1% by weight nickel as catalyst in a molten aluminum bath, at various temperatures of 1500 to 1600° F. The gaseous conversion product was hydrogen of 99–100% purity in all instances at gas feed rates as high as 100 ml./min.

Example III

Propane at room temperature was passed through a bath of molten aluminum of 5 inch depth, containing various amounts of nickel as catalyst. The effect of the catalyst on product distribution was significant only when concentrations above about 1% thereof were employed. At low temperatures in the order of about 1300° F. in the presence of 3.1% by weight nickel in the bath, and gas feed rates of 200 ml./min., the hydrogen content of the product gas was in the order of 4 times that obtained under the same conditions in the absence of nickel.

In the subjoined claims the term "metal" is intended to include not only the single metallic element but also alloys consisting of mixtures or combinations of metallic elements.

Obviously many modifications and variations of the invention as hereinbefore set forth may be made without departing from the spirit and scope thereof and therefore

We claim is our invention:

1. The method for the production of hydrogen and carbon from normally gaseous hydrocarbons, comprising decomposing such a hydrocarbon charge by contact at decomposition conditions including a temperature in the range of 1200° F. to 2000° F. with an atomized stream of molten metal contact material wherein said molten metal is characterized in having a melting point in the range of about 445° F. to about 1220° F., said contact material containing at least 1% and not more than about 10% by weight of the molten metal of dehydrogenating metal catalyst, said catalyst being at least one of the metals of the group consisting of iron, cobalt, nickel, chromium, molybdenum and platinum.

2. The method as defined in claim 1 wherein said molten metal is at least one metal selected from the group consisting of tin, antimony, lead, zinc, magnesium and aluminum.

3. In the method of decomposing normally gaseous hydrocarbons to elemental carbon and hydrogen by contact with molten metal containing a small amount of catalytic dehydrogenating metal selected from at least one of the metals of the group consisting of iron, cobalt, nickel, chromium, molybdenum and platinum at decomposition conditions including a temperature in the range of 1400° to 2000° F. the improvement comprising, introducing such a hydrocarbon charge into a stream of said catalyst-containing molten metal under conditions to form a molten metal spray, passing said spray upwardly in an enclosed reaction zone, effecting decomposition of said charge to products including carbon and hydrogen, passing the effluent from said reaction zone to a first separation zone, separating molten metal from said effluent, passing the effluent from said first separation zone to a second separation zone, separating in said second separation zone carbon particles from said last-mentioned effluent and recovering the gaseous reaction products comprising hydrogen.

References Cited in the file of this patent

UNITED STATES PATENTS

| | | |
|---|---|---|
| 1,392,788 | Paris | Oct. 4, 1921 |
| 2,418,385 | Masson | June 6, 1922 |
| 1,756,877 | Paris | Apr. 29, 1930 |
| 1,868,919 | Schmidt et al. | July 26, 1932 |
| 1,948,345 | Garofalo | Feb. 20, 1934 |
| 2,458,996 | iKnney et al. | Jan. 11, 1949 |

FOREIGN PATENTS

| | | |
|---|---|---|
| 516,991 | Germany | Jan. 29, 1931 |
| 328,048 | Great Britain | Apr. 24, 1930 |